United States Patent [19]

Okada et al.

[11] Patent Number: 5,287,120

[45] Date of Patent: Feb. 15, 1994

[54] COORDINATE DATA GENERATING APPARATUS

[75] Inventors: Satoru Okada; Hitoshi Yamagami; Katsuya Yamano, all of Kyoto, Japan

[73] Assignee: Nintendo Company Limited, Kyoto, Japan

[21] Appl. No.: 955,455

[22] Filed: Oct. 2, 1992

[30] Foreign Application Priority Data

Oct. 14, 1991 [JP] Japan .................. 3-295043

[51] Int. Cl.⁵ .............................. G09G 3/02
[52] U.S. Cl. .................. 345/163; 345/164; 345/157
[58] Field of Search .............. 340/710, 709, 706; 74/471 XY; 273/85 E

[56] References Cited

U.S. PATENT DOCUMENTS

| | | | |
|---|---|---|---|
| 4,624,537 | 11/1986 | Hanssen et al. | 340/709 |
| 4,734,685 | 3/1988 | Watanable | 340/710 |
| 4,912,672 | 3/1990 | Giorgio | 364/900 |

FOREIGN PATENT DOCUMENTS

| | | |
|---|---|---|
| 0248542 | 12/1987 | European Pat. Off. |
| 0375116A2 | 6/1990 | European Pat. Off. |
| 2932564 | 2/1981 | Fed. Rep. of Germany |
| 3931931 | 4/1991 | Fed. Rep. of Germany |

OTHER PUBLICATIONS 60-160429A p. 148, Jan. 8, 1986, vol. 10, No. 3.
62-236025A p. 685, Apr. 6, 1988, vol. 12, No. 104.
63-316120A p. 857, Apr. 17, 1989, vol. 13, No. 157.
60-117324A p. 401, Oct. 30, 1985, vol. 9, No. 274.
61-131116A p. 512, Nov. 5, 1986, vol. 10, No. 324.

Primary Examiner—Ulysses Weldon
Assistant Examiner—Matthew Luu
Attorney, Agent, or Firm—Nixon & Vanderhye

[57] ABSTRACT

An X-axis counter (101) and a Y-axis counter (102) detect velocities of the movement of a mouse in X-axis and Y-axis directions, respectively. A comparator (103) detects which of the velocities of the movement of the mouse in the X-axis and Y-axis directions is higher. An X-axis displacement amount correction data ROM (106) and a Y-axis displacement amount correction data ROM (107) correct a detection result by the X-axis counter (101) and a detection result by the Y-axis counter (102) with the same correction rate based upon detection results by the comparator (103) to output displacements in the X-axis and Y-axis directions.

10 Claims, 10 Drawing Sheets

FIG. 4
X-AXIS DISPLACEMENT AMOUNT CORRECTION DATA ROM

| Y VELOCITY | X VELOCITY | ADD | R | REMARKS |
|---|---|---|---|---|
| 000(0) | 000(0) | 000000 | 0 | ADDRESSES USED WHEN X VELOCITY IS HIGH |
| | 001(1) | 000001 | 1 | |
| | 010(2) | 000010 | 4 | |
| | 011(3) | 000011 | 9 | |
| | 100(4) | 000100 | 16 | |
| | 101(5) | 000101 | 25 | |
| | 110(6) | 000110 | 36 | |
| | 111(7) | 000111 | 49 | |
| 001(1) | 001(1) | 001001 | 1 | ADDRESSES USED WHEN Y VELOCITY IS HIGH |
| 010(2) | | 010001 | 2 | |
| 011(3) | | 011001 | 3 | |
| 100(4) | | 100001 | 4 | |
| 101(5) | | 101001 | 5 | |
| 110(6) | | 110001 | 6 | |
| 111(7) | | 111001 | 7 | |
| 010(2) | 010(2) | 010010 | 4 | |
| 011(3) | | 011010 | 6 | |
| 100(4) | | 100010 | 8 | |
| 101(5) | | 101010 | 10 | |
| 110(6) | | 110010 | 12 | |
| 111(7) | | 111010 | 14 | |
| 011(3) | 011(3) | 011011 | 9 | |
| 100(4) | | 100011 | 12 | |
| 101(5) | | 101011 | 15 | |
| 110(6) | | 110011 | 18 | |
| 111(7) | | 111011 | 21 | |
| 100(4) | 100(4) | 100100 | 16 | |
| 101(5) | | 101100 | 20 | |
| 110(6) | | 110100 | 24 | |
| 111(7) | | 111100 | 28 | |
| 101(5) | 101(5) | 101101 | 25 | |
| 110(6) | | 110101 | 30 | |
| 111(7) | | 111101 | 35 | |
| 110(6) | 110(6) | 110110 | 36 | |
| 111(7) | | 111110 | 42 | |
| 111(7) | 111(7) | 111111 | 49 | |

Y VELOCITY : DISPLACEMENT AMOUNT IN Y-AXIS DIRECTION
X VELOCITY : DISPLACEMENT AMOUNT IN X-AXIS DIRECTION
ADD : ROM ADDRESS
R : DATA IN ROM

FIG. 5
Y-AXIS DISPLACEMENT AMOUNT CORRECTION DATA ROM

| X VELOCITY | Y VELOCITY | ADD | R | REMARKS |
|---|---|---|---|---|
| 000(0) | 000(0) | 000000 | 0 | ADDRESSES USED WHEN Y VELOCITY IS HIGH |
|  | 001(1) | 000001 | 1 |  |
|  | 010(2) | 000010 | 4 |  |
|  | 011(3) | 000011 | 9 |  |
|  | 100(4) | 000100 | 16 |  |
|  | 101(5) | 000101 | 25 |  |
|  | 110(6) | 000110 | 36 |  |
|  | 111(7) | 000111 | 49 |  |
| 001(1) | 001(1) | 001001 | 1 | ADDRESSES USED WHEN X VELOCITY IS HIGH |
| 010(2) |  | 010001 | 2 |  |
| 011(3) |  | 011001 | 3 |  |
| 100(4) |  | 100001 | 4 |  |
| 101(5) |  | 101001 | 5 |  |
| 110(6) |  | 110001 | 6 |  |
| 111(7) |  | 111001 | 7 |  |
| 010(2) | 010(2) | 010010 | 4 |  |
| 011(3) |  | 011010 | 6 |  |
| 100(4) |  | 100010 | 8 |  |
| 101(5) |  | 101010 | 10 |  |
| 110(6) |  | 110010 | 12 |  |
| 111(7) |  | 111010 | 14 |  |
| 011(3) | 011(3) | 011011 | 9 |  |
| 100(4) |  | 100011 | 12 |  |
| 101(5) |  | 101011 | 15 |  |
| 110(6) |  | 110011 | 18 |  |
| 111(7) |  | 111011 | 21 |  |
| 100(4) | 100(4) | 100100 | 16 |  |
| 101(5) |  | 101100 | 20 |  |
| 110(6) |  | 110100 | 24 |  |
| 111(7) |  | 111100 | 28 |  |
| 101(5) | 101(5) | 101101 | 25 |  |
| 110(6) |  | 110101 | 30 |  |
| 111(7) |  | 111101 | 35 |  |
| 110(6) | 110(6) | 110110 | 36 |  |
| 111(7) |  | 111110 | 42 |  |
| 111(7) | 111(7) | 111111 | 49 |  |

Y VELOCITY : DISPLACEMENT AMOUNT IN Y-AXIS DIRECTION
X VELOCITY : DISPLACEMENT AMOUNT IN X-AXIS DIRECTION
ADD : ROM ADDRESS
R : DATA IN ROM

COORDINATE DATA GENERATING APPARATUS

BACKGROUND OF THE INVENTION

1. Field of the Invention

The present invention relates to a coordinate data generating apparatus, and more particularly, it relates to an apparatus for generating coordinate data for moving a cursor which appears on a screen of a display.

2. Description of the Prior Art

In data processors such as a personal computer, a television game machine, etc., increasingly complicated application softwares and game theories have promoted a necessity of rapid data input. A "mouse", namely, a coordinate data generating apparatus has been used to rapidly input data into such a data processor.

The mouse has a ball which rotates as the mouse moves, and it converts rotations of the ball into coordinate data in a two-dimensional plane and output the coordinate data. Specifically, the mouse detects rotations of the ball in two axial (X-axis and Y-axis) directions, and it outputs results of detection about both of the axes as coordinate data. A direction of the mouse and an amount of displacement of the mouse are expressed with a composite vector about the two axes. The data processor controls a position of a cursor on a screen of a display device like a CRT (cathode ray tube) display based upon the coordinate data received from the mouse. Controlling an amount of displacement of the cursor in this way, selection of a menu or command, plotting, etc. can be practiced rapidly.

In the case where the mouse is used to move the cursor on the screen, the cursor moves in proportion to the movement of the mouse. For example, assuming that the cursor moves by 5 cm when the mouse moves by 10 cm, the cursor moves by 10 cm when the mouse moves by 20 cm. In this case, even if the mouse moves quickly, an amount of displacement of the cursor simply depends upon an amount of displacement of the mouse. It is an annoying work for the operator to move mouse a long distance to move the cursor a long distance.

To overcome such disadvantage, there has been proposed a system for variably setting a rate of the displacement amount of the cursor to that of the mouse in accordance with a velocity of the moving mouse. This system is called "displacement amount varying system", which is disclosed, for example, in Japanese Unexamined Patent Publications 117324/1985 and 131116/1986. In such a displacement amount varying system, the rate of the displacement amount of the cursor to that of the mouse is set small like 1:1 or 2:1 with a slow movement of the mouse, while the rate of the displacement amount of the cursor to that of the mouse is set large like 3:1, 4:1 or the like with a quick movement of the mouse. FIG. 11 and FIG. 12 are diagrams for explaining relations between the velocity of the moving mouse and the displacement amount of the cursor in the displacement amount varying system. As shown in FIG. 11, when the mouse moves slowly, a displacement amount of the cursor to that of the mouse is small. On the other hand, as shown in FIG. 12, when the mouse moves quickly, the displacement amount of the cursor to that of the mouse is large. Thus, a quick movement of the mouse causes the cursor to move a long distance, and this requires only a small range for the mouse to move on a table.

In such a displacement amount varying system of the prior art, a correction of the displacement amount of the cursor according to the velocity of the moving mouse is controlled about one axis separately from the other. Specifically, in the prior art displacement amount varying system, the velocity of the moving mouse is found about X-axis and Y-axis directions, and the displacement amount of the cursor is corrected about one axial direction independent of the other in accordance with the velocity of the mouse moving in each axial direction. Hence, there arises problems as explained below when the cursor is moved diagonally across the screen of the display device.

FIGS. 13 and 14 are graphs showing relations between a vector of the movement of the mouse and a vector of the movement of the cursor. In FIGS. 13 and 14, broken line A represents the vector of the movement of the mouse while solid line B represents the vector of the movement of the cursor.

FIG. 13 shows a case where an angle $\theta$ between the X-axis and the vector A of the movement of the mouse is smaller than 45°. In this case, an X-axis component of the velocity of the mouse is larger than its Y-axis component. Consequently, in a correction rate of the displacement amount of the cursor to that of the mouse, the correction rate about the X-axis direction is larger than that about the Y-axis direction. This means that a displacement amount of the cursor in the X-axis direction in accordance with a unit displacement amount of the mouse in the X-axis direction is longer than a displacement amount of the cursor in the Y-axis direction in accordance with the unit displacement amount of the mouse in the Y-axis direction. Thus, an angle $\alpha$ between the X-axis and the vector B of the movement of the cursor is smaller than the angle $\theta$; that is, the direction of the movement of the cursor does not coincide with the direction of the movement of the mouse.

FIG. 14 shows a case where the angle $\theta$ between the X-axis and the vector A of the movement of the mouse is larger than 45°. In this case, a Y-axis component of the velocity of the mouse is larger than its X-axis component. Consequently, in a correction rate of the displacement amount of the cursor to that of the mouse, the correction rate about the Y-axis direction is larger than the correction rate about the X-axis direction. This means that a displacement amount of the cursor in the Y-axis direction in accordance with a unit displacement amount of the mouse in the Y-axis direction is longer than a displacement amount of the cursor in the X-axis direction in accordance with the unit displacement amount of the mouse in the X-axis direction. Thus, the angle $\alpha$ between the X-axis and the vector B of the movement of the cursor is larger than the angle $\theta$; that is, the direction of the movement of the cursor does not coincide with the direction of the movement of the mouse.

As described above, in the displacement amount varying system of the prior art, when the mouse moves diagonally, the direction of the movement of the mouse and that of the cursor deviate from each other. The operator feels considerably uncomfortable to a deviation caused between those directions during the operation, because it is very difficult for him or her to move the cursor in any desired direction. For example, when the cursor is to be moved diagonally across the screen from the lower left to the upper right, the cursor actually moves in a direction along the angle $\alpha$ in spite of the operator's intention to move the cursor in a direction along the angle $\theta$. Moreover, since the velocity of the movement of the mouse is varied each time the operator uses the mouse, the direction of the movement of the cursor is accordingly varied each time, and the destination of the cursor is never in accord with the direction of the movement of the mouse on any trial.

SUMMARY OF THE INVENTION

A general object of the present invention is to provide a coordinate data generating apparatus in which a cursor can be quickly moved on a screen, and a direction of the movement of the cursor can be accurately controlled.

The present invention is directed to a coordinate data generating apparatus which has a ball rotatable in any direction and which is for converting the quantity of the rotation of the ball into distance data about X-axis and Y-axis directions orthogonal to each other in a two-dimensional plane, comprising rotational quantity detecting means for detecting the quantities of the rotation of the ball in the X-axis and Y-axis directions for each predetermined period of time, comparing means for comparing the quantity of the rotation of the ball in the X-axis direction for the predetermined period of time with the quantity of the rotation of the ball in the Y-axis direction for that period of time, both of which are detected by the rotational quantity detecting means, and correcting means responding to comparison results from the comparing means for correcting displacements of the ball in the X-axis and Y-axis directions corresponding to the rotational quantities of the ball in the X-axis and Y-axis directions based upon only a first correction parameter determined in accordance with a variation in the rotational quantity of the ball in the X-axis direction when the rotational quantity of the ball in the X-axis direction for the predetermined period of time is larger than that in the Y-axis direction, or for correcting displacements of the ball in the X-axis and Y-axis directions corresponding to the rotational quantities of the ball in the X-axis and Y-axis directions based upon only a second correction parameter determined in accordance with a variation in the rotational quantity of the ball in the Y-axis direction when the rotational quantity of the ball in the Y-axis direction for the predetermined period of time is larger than that in the X-axis direction.

According to the present invention, the rotational quantity of the ball in the X-axis direction for the predetermined period of time is compared with that in the Y-axis direction, and in accordance with comparison results, displacements of the ball in the X-axis and Y-axis directions are corrected using only one of the first and second parameters; hence, a direction of the movement of the ball can always coincide with a direction (angles) of a vector expressed by the corrected displacement amount of the ball in the X-axis and Y-axis directions.

Other objects, advantages, and innovative features of the present invention will be partly stated in the following description, will become partly apparent to a person having a ordinary skill in the art from the following description, or will be well understood in practicing the present invention. The objects and advantages of the present invention will be effected and attained by means and combinations thereof particularly defined in the appended claims.

BRIEF DESCRIPTION OF THE DRAWINGS

FIG. 4 is a diagram showing relations between addresses and stored data in an X-axis displacement amount correction data ROM 106 of FIG. 3;

FIG. 5 is a diagram showing relations between addresses and stored data in a Y-axis displacement amount correction data ROM 107 of FIG. 3;

DETAILED DESCRIPTION OF THE PREFERRED EMBODIMENT

Figure 1:
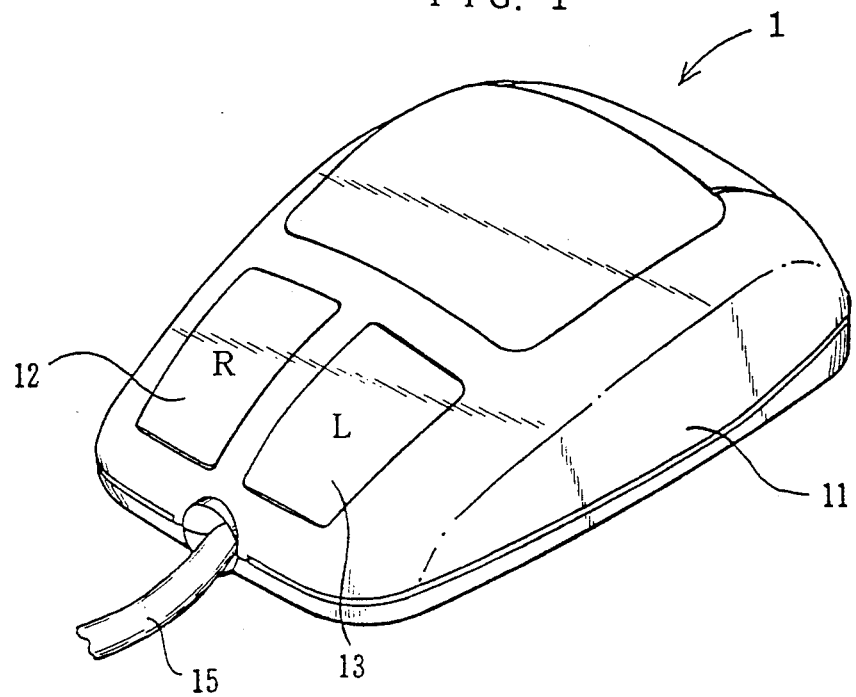
FIG. 1 is a perspective view showing a mouse of a preferred embodiment of the present invention when seen from above.
Figure 2:
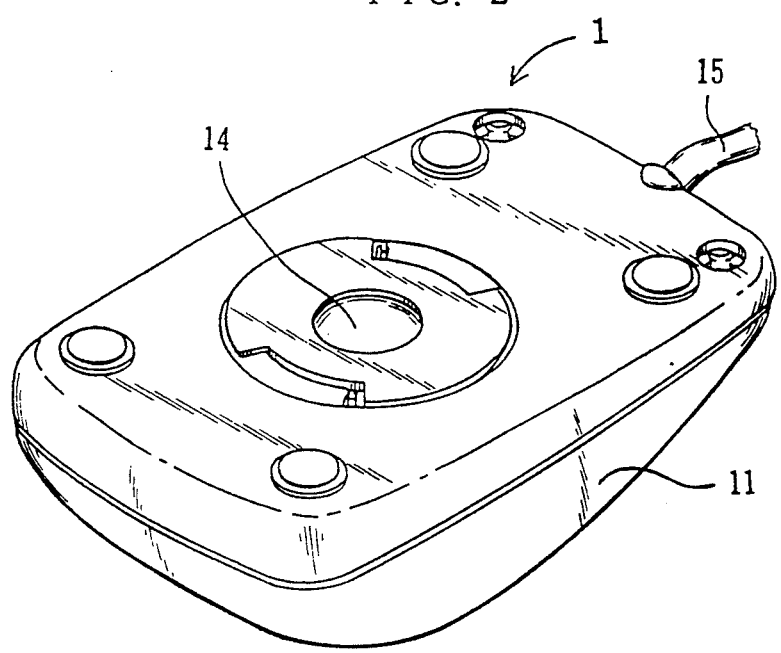
FIG. 2 is a perspective view of the mouse of the preferred embodiment of the present invention when seen from under.

FIGS. 1 and 2 are schematic diagrams showing an appearance of a mouse of a preferred embodiment according to the present invention. As shown in FIGS. 1 and 2, a mouse 1 has a housing 11. A top side of the housing 11 is provided with a right click switch 12 and a left click switch 13. The click switches 12 and 13 are used for selecting a menu or command, and specifying beginning and end positions between which a cursor moves. A bottom side of the housing 11 is provided with a ball 14. As the mouse moves on a plate, the ball 14 rotates along a direction of the movement of the mouse 1. The mouse 1 converts rotations of the ball 14 into coordinate data and outputs it to a cord 15. The cord 15 is connected to a image processor such as a personal computer, a television game machine, etc.

Figure 3:
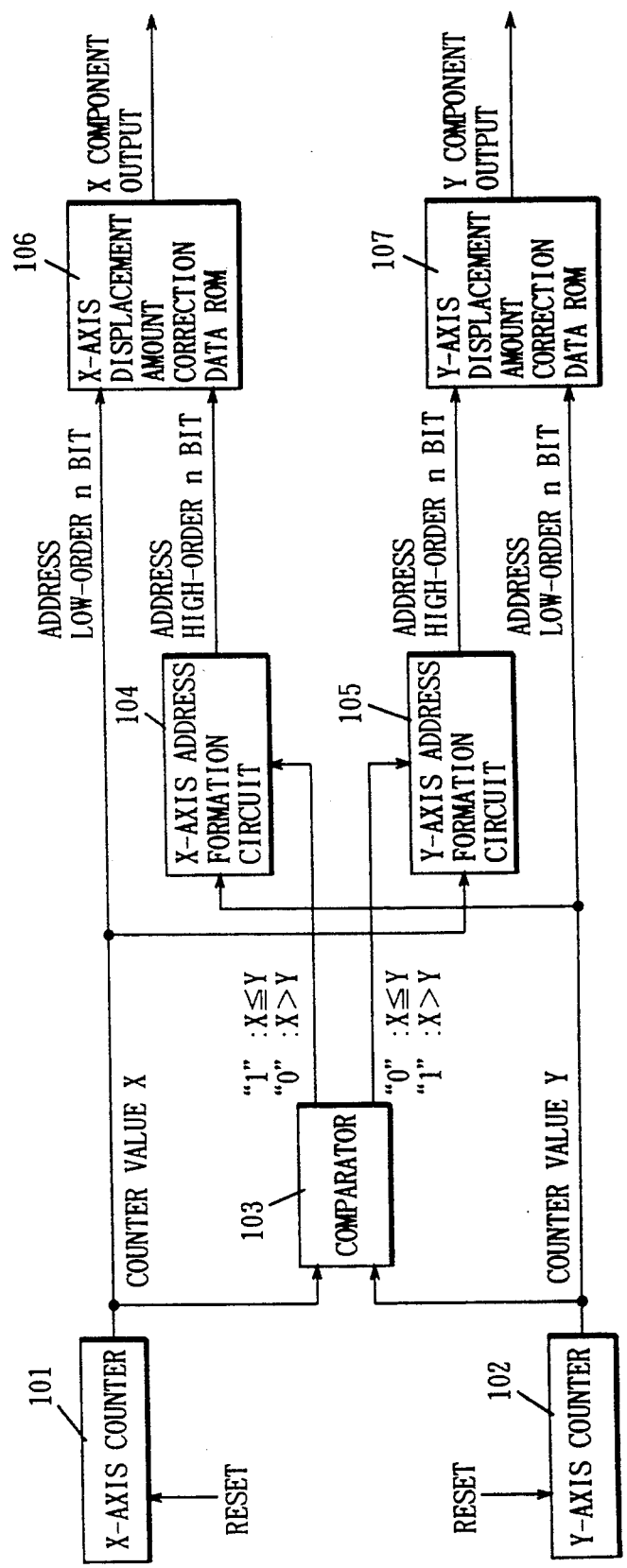
FIG. 3 is a block diagram showing an architecture of the mouse of the preferred embodiment of the present invention.

FIG. 3 is a block diagram showing part of the mouse shown in FIG. 2 which is especially related to a displacement amount varying system. In FIG. 3, the mouse 1 includes an X-axis counter 101, a Y-axis counter 102, a comparator 103, an X-axis address formation circuit 104, a Y-axis address formation circuit 105, an X-axis displacement amount correction data ROM 106, and a Y-axis displacement amount correction data ROM 107.

Although not shown in FIG. 3, the mouse I includes a rotary encoder (hereinafter, referred to as "X-axis rotary encoder") for detecting rotations of the ball 14 in the X-axis direction and a rotary encoder (hereinafter, referred to as "Y-axis rotary encoder") for detecting rotations of the ball 14 in the Y-axis direction. The X-axis counter 101 counts an output pulse from the X-axis rotary encoder to detect a displacement amount of the mouse 1 in the X-axis direction. The X-axis counter 101 is reset every specified period of time (e.g., a period for a single vertical scanning $=1/60$ sec), and it outputs a counter value X as data about the velocity of the movement of the mouse 1 in the X-axis direction. Similarly, the Y-axis counter 102 counts an output pulse from the Y-axis rotary encoder to detect a displacement amount of the mouse 1 in the Y-axis direction. The Y-axis counter 102 is reset every specified period of time (e.g., a period for a single vertical scanning $=1/60$ sec), and it outputs a counter value Y as data about the velocity of the movement of the mouse 1 in the Y-axis direction.

The counter value X of the X-axis counter 101 has n bit (n is a positive integer), which is applied to the comparator 103, the Y-axis address formation circuit 105, and the X-axis displacement amount correction data ROM 106. The counter value Y of the Y-axis counter 102 has n bit, which is applied to the comparator 103, the X-axis address formation circuit 104, and the Y-axis displacement amount correction data ROM 107.

The comparator 103 compares the counter value X with the counter value Y, and it outputs comparison results to the X-axis address formation circuit 104 and the Y-axis address formation circuit 105. Output from the X-axis address formation circuit 104 is applied to the X-axis displacement amount correction data ROM 106. Output from the Y-axis address formation circuit 105 is applied to the Y-axis displacement amount correction data ROM 107.

The X-axis displacement amount correction data ROM 106 stores data which is corrected based upon the velocity in the X-axis direction so as to be used as X-axis output when the velocity in the X-axis direction is larger, and data which is corrected based upon the velocity in the Y-axis direction so as to be used as X-axis output when the velocity in the Y-axis direction is larger. Similarly, the Y-axis displacement amount correction data ROM 107 stores data which is corrected based upon the velocity in the Y-axis direction so as to be used as Y-axis output when the velocity in the Y-axis direction is larger. The data stored in the X-axis displacement amount correction data ROM 106 is shown in FIG. 4. The data stored in the Y-axis displacement amount correction data ROM 107 is shown in FIG. 5.

In this embodiment, a displacement amount in the X-axis direction and that in the Y-axis direction are always corrected with the same correction rate. For example, the velocities in the X-axis and Y-axis directions are compared by the comparator 103 in advance, and a correction rate of the larger one of those velocities is utilized to correct both of the displacements in the X-axis and Y-axis directions. As a result, the displacement amount in one direction related to the lower velocity is widely corrected in proportion to the displacement amount in the other direction related to the higher velocity. If the correction rates about the X-axis and Y-axis directions are identical, a variation in a value of the correction rates exerts no effect upon the angles $\theta$ and $\alpha$ before and after correction, and these angles are always identical to each other (see FIGS. 6 and 7). In this way, the cursor moves in the same direction as the mouse moves.

An operation of the embodiment shown in FIGS. 1 through 3 will now be explained. In the following explanation, for example, the counter value X of the X-axis counter 101 and the counter value Y of the Y-axis counter 102 are 3 bit, respectively. This permits velocities of the mouse to be discriminated up to seven stages, 001 through $111=$1st stage through 7th stage (or eight stages, counting 000). A correction rate in accordance with the velocity of the mouse can be optionally determined, and in the following description, for example, it is assumed that the correction rate is one time with the velocity 1, two times with 2, three times with 3, four times with 4, five times with 5, six times with 6, and seven times with 7.

(1) The Operation When the Velocity of the Mouse in the X-axis Direction Is Higher than That in the Y-axis Direction First, a way of specifying addresses in the X-axis displacement amount correction data ROM 106 will be described. The counter value X of the X-axis counter 101 and the counter value Y of the Y-axis counter 102 are compared by the comparator 103. When the counter value X is larger than the counter value Y, or when the velocity of the mouse in the X-axis direction is higher than that in the Y-axis direction, the comparator 103 applies "0" to the X-axis address formation circuit 104 and "1" to the Y-axis address formation circuit 105, Conversely, when the counter value Y is larger than the counter value X, or when the velocity of the mouse in the Y-axis direction is higher than that in the X-axis direction, the comparator 103 applies "0" to the Y-axis address formation circuit 105 and "1" to the X-axis address formation circuit 104.

An address of the X-axis displacement amount correction data ROM 106 has the numbers of six digits (6 bit), and the counter value X is input to the lower 3 bit thereof. Since the counter value X is 3 bit, the lower 3 bit of the address range from 000 to 111 (0 to 7). In this case, the X-axis address formation circuit 104 receives the counter value Y, and "0" from the comparator 103. In accordance with the counter value Y and the "0" from the comparator 103, the X-axis address formation circuit 104 forms the higher 3 bit of the address of the X-axis displacement amount correction data ROM 106 to output them to the X-axis displacement amount correction data ROM 106.

Signals from the comparator 103 are applied as a kind of switch signal to the X-axis address formation circuit 104. Specifically, when a signal from the comparator 103 is "0", the X-address formation circuit 104 generates 000 indifferent of the magnitude of the counter value Y to output them to the X-axis displacement amount correction data ROM 106. Conversely, when a signal from the comparator 103 is "1", the very counter value Y input to the X-axis address formation circuit 104 is applied to the X-axis displacement amount correction data ROM 106.

In the above case (1), since the signal from the comparator 103 is "0", the higher 3 bit of the 6 bit address of the X-axis displacement amount correction data ROM 106 are 000. Thus, the address of the X-axis displacement amount correction data ROM 106 specified at this time varies in a range from 000000 to 000111. Since the counter value Y is 3 bit, the displacement amount in the X-axis direction is corrected up to seven stages. The X-axis displacement amount correction data ROM 106 reads a corrected data about the X-axis from an area specified by the received 6 bit address data to output it.

When the velocity in the X-axis direction is higher than that in the Y-axis direction, a correction rate about the X-axis direction is determined based upon the velocity in the X-axis direction. Hence, the address 000000 of the X-axis displacement amount correction data ROM 106 stores data 0 which is obtained by multiplying the velocity 0 by the correction rate 0 corresponding to the velocity 0, the address 000001 stores data 1 which is obtained by multiplying the velocity 1 by the correction rate 1 corresponding to the velocity 1, the address 000010 stores data 4 which is obtained by multiplying the velocity 2 by the correction rate 2 corresponding to the velocity 2, and so forth. Eventually, the address 000111 stores data 49 which is obtained by multiplying the velocity 7 by the correction rate 7 corresponding to the velocity 7. FIG. 4 shows relations between the addresses in the X-axis displacement amount correction data ROM 106 and the data stored therein. Although the X-axis displacement amount correction data ROM 106 must also store data in the case where the velocity in the Y-axis direction is higher than that in the X-axis direction, these data are specified similar to addresses of the Y-axis displacement amount correction data ROM 107 as described below, and therefore, the detailed description about them is omitted.

Then, a way of specifying addresses of the Y-axis displacement amount correction data ROM 107 will be described. As mentioned above, the comparator 103 outputs "0" to the X-axis displacement amount correction data ROM 106 and outputs "1" to the Y-axis displacement amount correction data ROM 107.

An address of the Y-axis displacement amount correction data ROM 107 has the numbers of six digits (6 bit), and the counter value Y is input to the lower 3 bit of them. Similar to the X-axis displacement amount correction data ROM 106, the lower 3 bit of the address of the Y-axis displacement amount correction data ROM 107 range from 000 to 111. In the case (1), the Y-axis displacement amount correction data ROM 107 receives the counter value X, and "1" from the comparator 103. The operation of the Y-axis address formation circuit 105 is similar to that of the X-axis address formation circuit 104. In this case, since an input signal received from the comparator 103 is "1", the Y-axis address formation counter 105 outputs the very counter value X to the Y-axis displacement amount correction data ROM 107. The counter value X is input as the higher 3 bit of the address to the Y-axis displacement amount correction data ROM 107. The higher 3 bit of the address of the Y-axis displacement amount correction data ROM 107 varies in a range from 000 to 111.

As will be recognized in the above statement, the address of the Y-axis displacement amount correction data ROM 107 specified in this case varies in a range of 000000 and from 001000 to 111111. Since the counter value Y is 3 bit, a displacement amount in the Y-axis direction can be corrected up to seven stages. The Y-axis displacement amount correction data ROM 107 reads a corrected data about the Y-axis from an area specified by the received 6 bit address data to output it.

As stated above, when the velocity in the X-axis direction is higher than that in the Y-axis direction, a correction rate about the Y-axis direction is also determined based upon the velocity in the X-axis direction. In other words, the velocity in the Y-axis direction and that in the X-axis direction are required for a correction of the displacement amount in the Y-axis direction. Since the velocity in the X-axis direction varies indifferent of the velocity in the Y-axis direction, the Y-axis displacement amount correction data ROM 107 must retain data on all combinations in which the velocity in the X-axis direction is higher than that in the Y-axis direction. Specifically, combinations where the velocity in the X-axis direction is higher than that in the Y-axis direction include those where the velocity in the X-axis direction is 2 (010), 3 (011), 4 (100), 5 (101), 6 (110) and 7 (111) when the velocity in the Y-axis direction is 1 in each state of the velocity in the X-axis direction. With other states of the velocity in the Y-axis direction, there are variety of combinations similar to the above. Those combinations are all addresses; for example, assuming that the velocity in the X-axis direction is 6 (110) with the velocity 2 (010) in the Y-axis direction, a displacement amount data corrected is found $2 \times 6 = 12$ since the correction rate is determined 6 times when the velocity is 6 in this case. Thus, 12 is stored in the address 110010 (the higher 3 bit of them is an X component while the lower 3 bit is a Y component). FIG. 5 shows relations between all the addresses and data in the Y-axis displacement amount correction data ROM 107.

(2) The Operation When the Velocity of the Mouse in the Y-axis Direction Is Higher that That in the X-axis Direction The operation in this case is completely converse to the operation in the previously mentioned case (1), and therefore, correlations between procedures about the X- and Y-axis are simply converse to the previous ones. Thus, the X-axis displacement amount correction data ROM 106 and the Y-axis displacement amount correction data ROM 107 store completely the same data.

(3) The Operation When the Velocity of the Mouse in the X-axis Direction and That in the Y-axis direction Are Equal In this case, the comparator 103 applies "1" to the X-axis address formation circuit 104 and "0" to the Y-axis address formation circuit 105. Thus, when the velocity in the X-axis direction and that in the Y-axis direction are identical, a processing procedure is taken on the supposition that the velocity in the Y-axis direction is higher than that in the X-axis direction.

Figure 6:
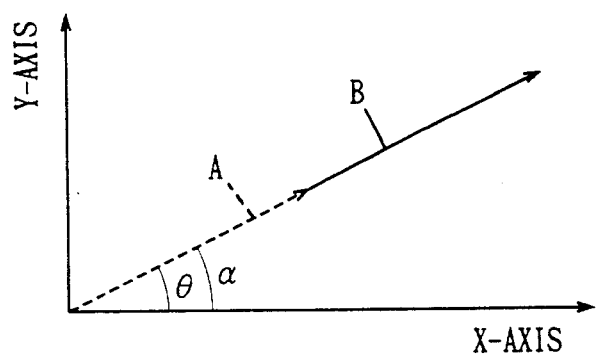
FIG. 6 is a graph showing a relation between a direction of the movement of the mouse and that of the cursor when an angle between the X-axis and the direction of the movement of the mouse is smaller than 45° in the embodiment shown in FIG. 3.
Figure 7:
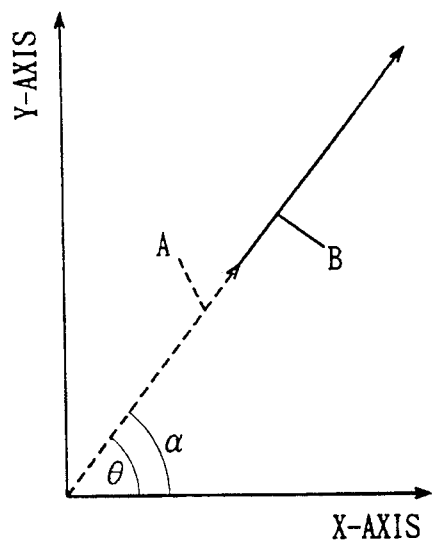
FIG. 7 is a graph showing a relation between a direction of the movement of the mouse and that of the cursor when an angle between the X-axis and the direction of the movement of the mouse is larger than 45° in the embodiment shown in FIG. 3.

As has been described, in this embodiment, a correction is practiced with a correction rate about the higher one of the velocities in the X-axis and Y-axis directions even if those velocities are different from each other, and therefore, as shown in FIGS. 6 and 7, an angle $\theta$ along which the mouse moves against the horizontal direction and an angle $\alpha$ along which the cursor moves on a screen always coincide with each other.

Figure 8:
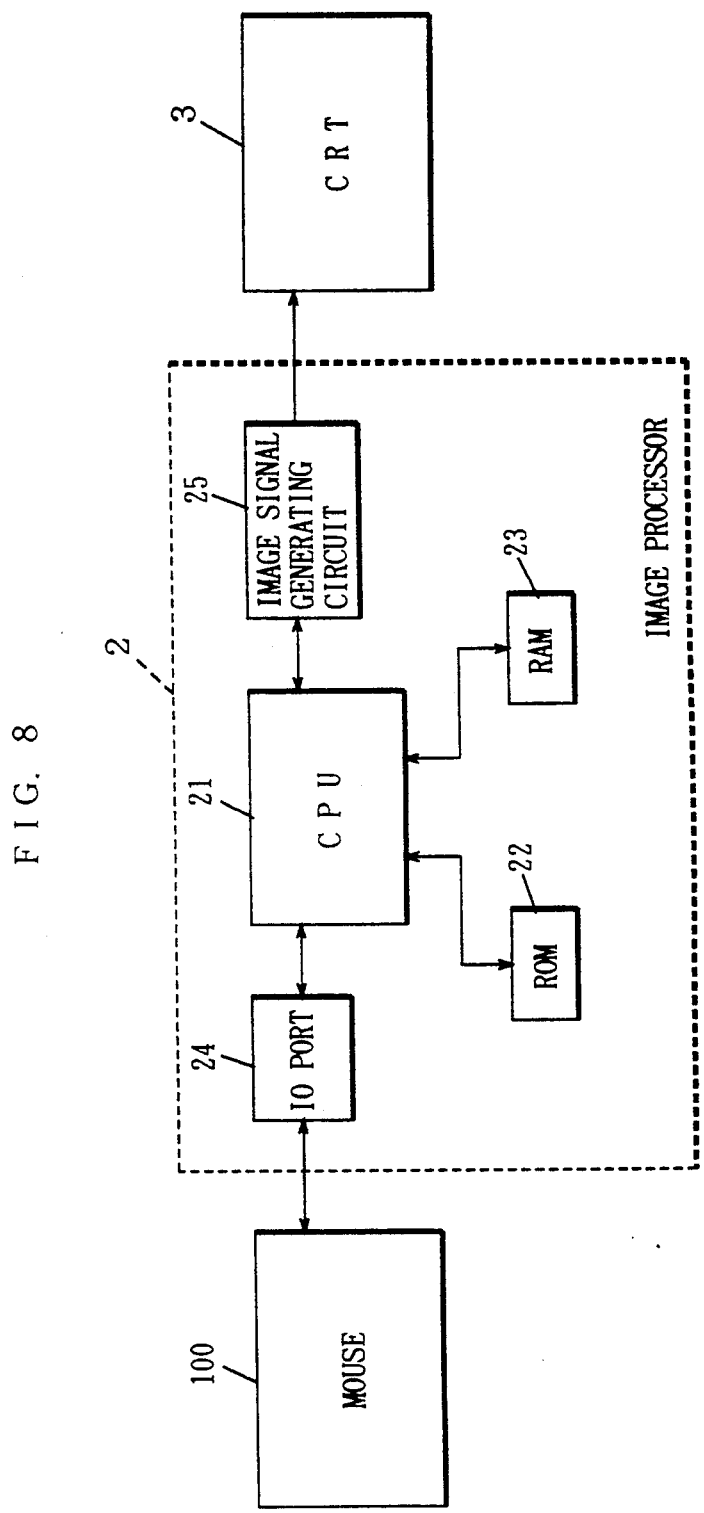
FIG. 8 is a block diagram showing an example of an architecture of a data processing system with the mouse of the present invention.

FIG. 8 is a block diagram showing an exemplary architecture of a data processing system using the mouse of the above embodiment according to the present invention. In FIG. 8, a mouse 100 is connected to an image processor 2. The image processor 2 includes a CPU 21, a ROM 22, a RAM 23, an IO port 24, and an image signal generator 25. The CPU 21 receives a coordinate data from the mouse 100 via the IO port 24. The CPU 21 processes the received coordinate data in accordance with a program stored in the ROM 22, and it applies its output data to the image signal generator 25. The image signal generator 25 generates an image signal based upon the data received from the CPU 21 to output the image signal to a CRT display 3. The CRT display 3 represents information on its screen based upon the image signal. Such a processing system is used for a personal computer, a television game machine, etc.

Figure 9:
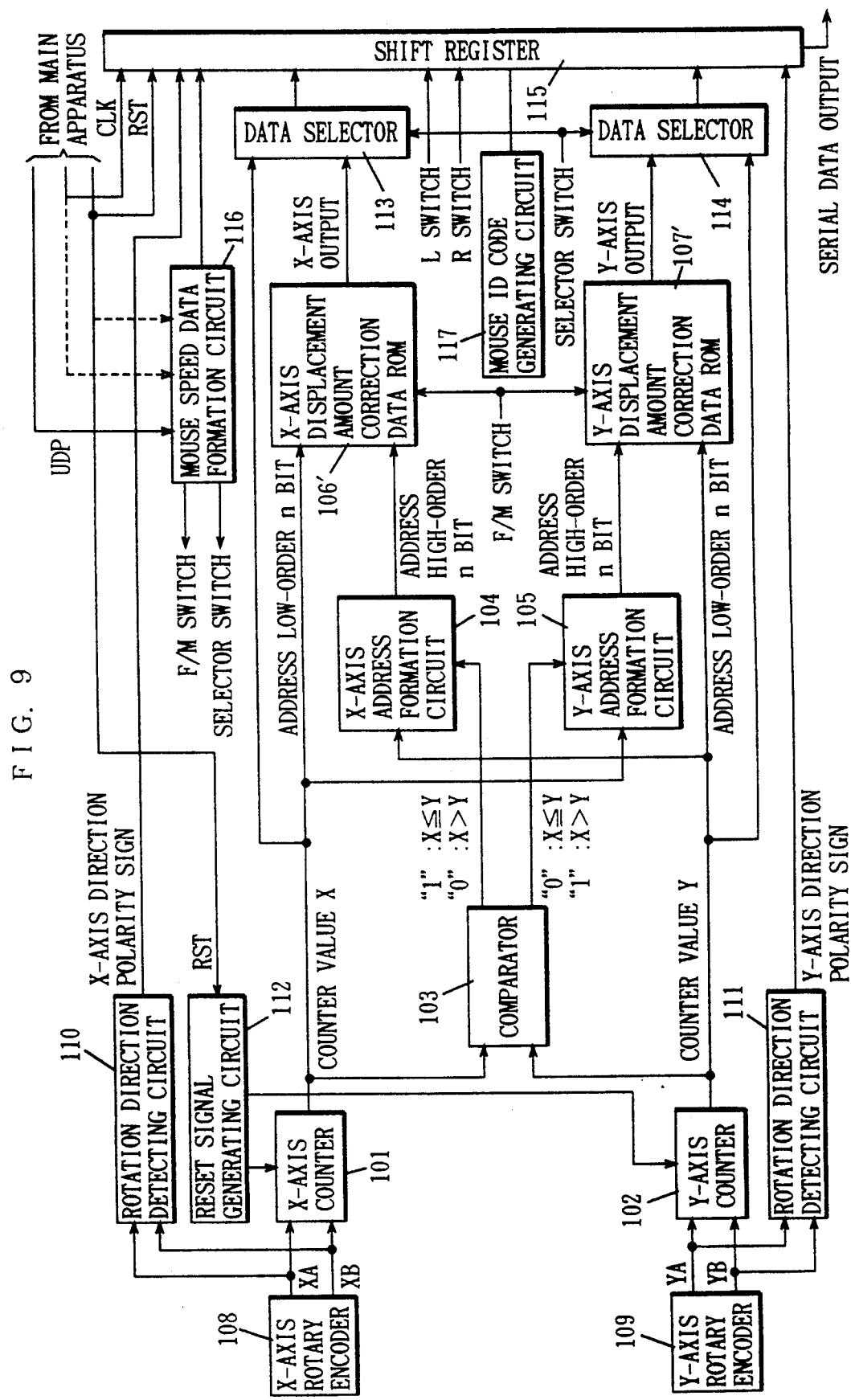
FIG. 9 is a block diagram showing an architecture of a mouse of another preferred embodiment of the present invention.

FIG. 9 is a block diagram showing an exemplary architecture of a mouse of another embodiment according to the present invention, which is utilized in the data processing system as shown in FIG. 8. In FIG. 9, the mouse, similar to the mouse shown in FIG. 3, includes an X-axis counter 101, a Y-axis counter 102, a comparator 103, an X-axis address formation circuit 104, a Y-axis address formation circuit 105, an X-axis displacement amount correction data ROM 106', and a Y-axis displacement amount correction data ROM 107'. However, the X-axis displacement amount correction data ROM 106' and the Y-axis displacement amount correction data ROM 107' store data somewhat different from the data stored in the X-axis displacement amount correction data ROM 106 and Y-axis displacement amount correction data ROM 107 shown in FIG. 3. For example, the X-axis displacement amount correction data ROM 106' stores two lists of corrected data as shown in FIG. 4. One of those lists is the one for fast operation while the other is the one for middle-speed operation. The most significant bit of the address of the corrected data list for fast operation assumes "1" when the most significant bit of the address of the corrected data list for middle-sped operation assumes "0", or vice versa. Similarly, the Y-axis displacement amount correction data ROM 107' stores a list of corrected data for fast operation and a list of corrected data for middle-speed operation. Then, the most significant bit of the address of the corrected data list for fast operation in the Y-axis displacement amount correction data ROM 107' assume "1" when the most significant bit of the address of the corrected data list for middle-speed operation assumes "0", or vice versa. Thus, the preferred embodiment shown in FIG. 9 carries in advance two lists of corrected data for fast and middle-speed operations. Moreover, the embodiment in FIG. 9 is arranged so that it can output a non-corrected displacement amount data. In other words, in the embodiment in FIG. 9, user can select, as he or she desires, among a displacement amount data corrected in accordance with the corrected data for fast operation, a displacement amount data corrected in accordance with the corrected data for middle-speed operation, and a non-corrected displacement amount data.

Referring to FIG. 9, an X-axis rotary encoder 108 detects the rotation of a ball mounted on the mouse in the X-axis direction to output detection pulses XA and XB. The detection pulses XA and XB are output, being out of phase from each other by a specified angle. The detection pulses XA and XB are applied to the X-axis counter 101 and a rotation direction detecting circuit 110. The rotation direction detecting circuit 110 judges which of the detection pulses XA and XB is output first to detect a direction of the rotation of the ball along the X-axis direction. Results of a detection by the rotation direction detecting circuit 110 are applied as an X-axis direction polarity sign to a shift register 115. Similarly, a Y-axis direction rotary encoder 109 detects the rotation of the ball mounted on the mouse in the Y-axis direction to output detection pulses YA and YB. The detection pulses YA and YB are output, being out of phase from each other by a specified angle. The detection pulses YA and YB are applied to a Y-axis counter 102 and a rotation direction detecting circuit ill. The rotation direction detecting circuit 111 judges which of the detection pulses YA and YB is output first to detect a direction of the rotation of the ball along the Y-axis direction. Results of a detection of the rotation direction detecting circuit Ill are applied as a Y-axis direction polarity sign to the shift register 115.

The X-axis counter 101 counts an exclusive OR of the detection pulses XA and XB. Similarly, the Y-axis counter 102 counts an exclusive OR of the detection pulses YA and YB. The X-axis counter 101 and the Y-axis counter 102 are reset every specified period of time (e.g., 1/60 sec) in accordance with a reset signal output from a reset signal generator 112. This causes the X-axis counter 101 and Y-axis counter 102 to output the quantity of the rotation of the ball in the X-axis direction and that in the Y-axis direction for the specified period of time, namely, the rotation rate in the X-axis direction and that in the Y-axis direction. The reset signal generator 112 resets the X-axis counter 101 and the Y-axis counter 102 in response to a reset signal RST received from the image processor shown in FIG. 8.

A counter value X output from the X-axis counter 101 and a corrected distance data about the X-axis direction read from the X-axis displacement amount correction data ROM 106' are applied to a data selector 113. A counter value Y output from the Y-axis counter 102 and a corrected distance data about the Y-axis direction read from the Y-axis displacement amount correction data ROM 107' are applied to a data selector 114. In response to a selector switch signal received from a mouse speed data formation circuit 116, the data selector 113 selects any of the counter value X and corrected distance data about the X-axis to output it to the shift register 115. Similarly, in response to a selector switch signal received from the mouse speed data formation circuit 116, the data selector 114 selects any of the counter value Y and corrected distance data about the Y-axis direction to output it to the shift register 115.

The mouse speed data formation circuit 116 is formed of a 2 bit ring counter, for example. The mouse speed data formation circuit 116 sequentially updates its count value in response to an update pulse UDP received from the image processor 2 shown in FIG. 8. The higher bit of count data of the mouse speed data formation circuit 116 is applied as a fast/middle-speed switch signal to the X-axis displacement amount correction data ROM 106' and Y-axis displacement amount correction data ROM 107'. The lower bit of the count data of the mouse speed data formation circuit 116 is applied as a low-speed switch signal to the data selectors 113 and 114.

A mouse identification code generator 117 generates a mouse identification code to output it to the shift register 115.

The shift register 115 also receives a clock pulse CLK and a reset signal RST from the image processor 2 shown in FIG. 8. Also, the shift register 115 receives click pulses from the right and left click switches 12, 13 shown in FIG. 1. The shift register 115 converts various data and signals applied thereto into serial data to output them to the image processor in response to the clock pulse CLK.

Then, the operation of the embodiment shown in FIG. 9 will be described. First, the operation in the case where the mouse speed data formation circuit 116 gives instructions to read a data for low-speed operation will be explained. In this case, the data selector 113 selects the counter value X while the data selector 114 selects the counter value Y, and they output the counter values X and Y to the shift register 115, respectively. Thus, the shift register 115 eventually outputs a non-corrected distance data.

Figure 10:
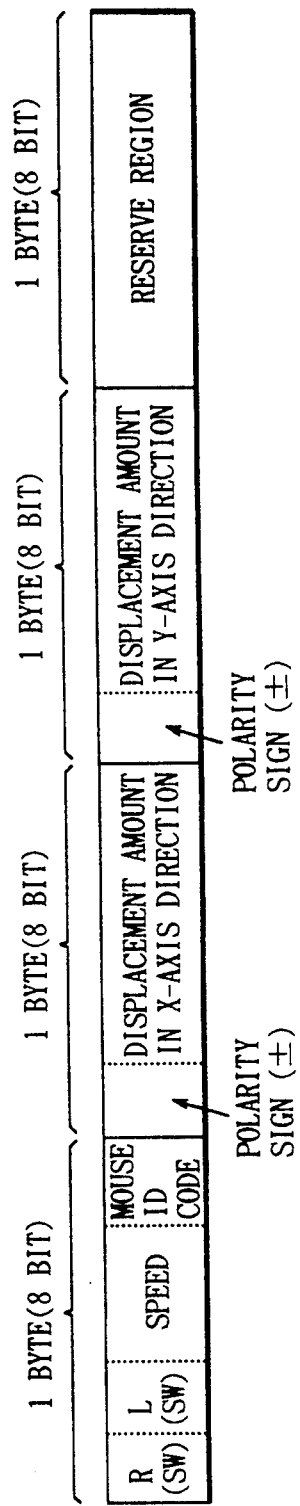
FIG. 10 is a diagram showing an exemplary format of data output from a shift register 115 of FIG. 9.
Figure 11:
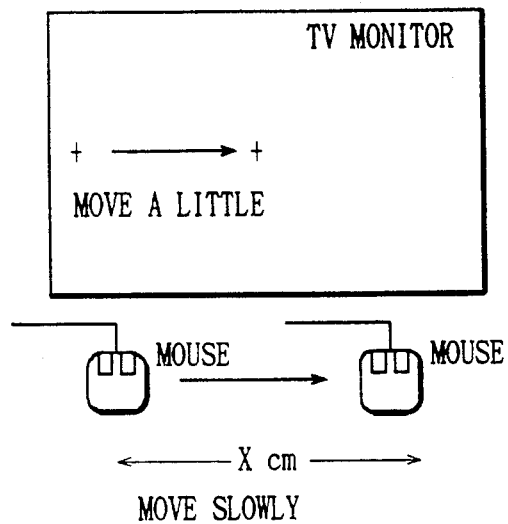
FIG. 11 is a diagram showing a state where a cursor is moving when the mouse moves slowly in a prior art displacement amount varying system.
Figure 12:
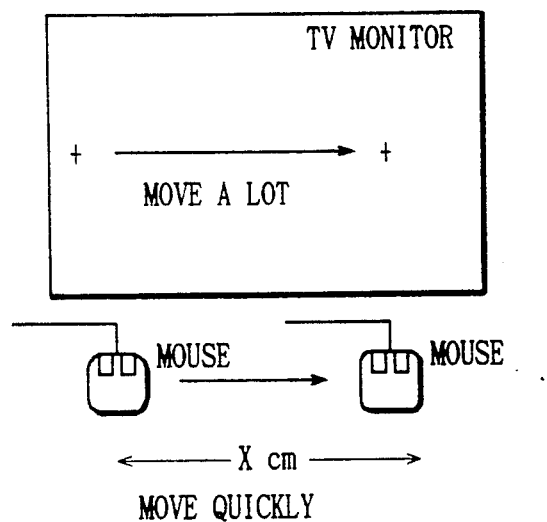
FIG. 12 is a diagram showing a state where the cursor is moving when the mouse moves quickly in the prior art displacement amount varying system.
Figure 13:
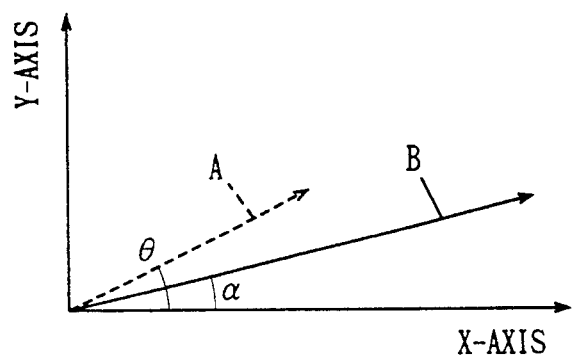
FIG. 13 is a graph showing relations between a direction of the movement of the mouse and that of the cursor when an angle between the X-axis and the direction of the movement of the mouse is smaller than 45° in the prior art displacement amount varying system.
Figure 14:
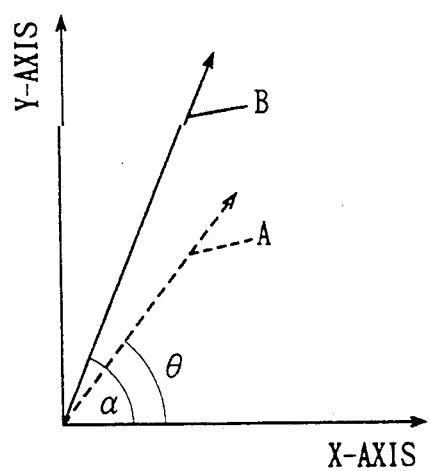
FIG. 14 is a graph showing relations between a direction of the movement of the mouse and that of the cursor when an angle between the X-axis and the direction of the movement of the mouse is larger than 45° in the displacement amount varying system of the prior art.

FIG. 10 shows a data format for one word output from the shift register 115. As shown in FIG. 10, data for one word contains first through fourth byte data (1 byte is, for example, 8 bit). A click pulse from the right click switch 12, a click pulse from the left click switch 13, speed data from the mouse speed data formation circuit 116, and a mouse identification code from the mouse identification code generator 117 are stored in the first byte. The mouse identification code is a code predetermined to give information to a device (e.g., CPU) connected to the mouse that the mouse is already connected thereto. An X-axis direction polarity sign from the rotation direction detecting circuit 110 and an X-axis direction displacement amount from the data selector 113 are stored in the second byte. A Y-axis direction polarity signal from the rotation direction detecting circuit 111 and a Y-axis direction displacement amount from the data selector 114 are stored in the third byte. The fourth byte is used as a reserve region for storing other data. When a command is given to read the data for low-speed operation as previously mentioned, the second and third bytes store the counter value X and the counter value Y, respectively.

The shift register 115 serially outputs the data for one word shown in FIG. 10 in response to the clock pulse CLK.

Then, the operation in the case where the mouse speed data formation circuit 116 gives instructions to read data for middle-speed operation will be explained. In this case, the X-axis displacement amount correction data ROM 106' and the Y-axis displacement amount correction data ROM 107' read a corrected displacement amount in the X-axis direction and that in the Y-axis direction from a list of corrected data for middle-speed operation, respectively, to output them. On the other hand, the data selectors 113 and 114 select an output from the X-axis displacement amount correction data ROM 106' and an output from the Y-axis displacement amount correction data ROM 107', respectively, to output them to the shift register 115. Thus, the second and third bytes of the data format shown in FIG. 10 store the X-axis direction displacement amount for middle-speed operation read from the X-axis displacement amount correction data ROM 106' and the Y-axis direction displacement amount for middle-speed operation read from the Y-axis displacement amount correction data ROM 107', respectively. After that, the shift register 115 serially outputs data for one word.

Then, the operation in the case where the mouse speed data formation circuit 116 gives instructions to read data for fast operation will be described. In this case, the X-axis displacement amount correction data ROM 106' and the Y-axis displacement amount correction data ROM 107' read a corrected displacement amount in the X-axis direction and that in the Y-axis direction from a list of corrected data for fast operation, respectively, to output them. On the other hand, the data selectors 113 and 114 select an output from the X-axis displacement amount correction data ROM 106' and an output from the Y-axis displacement amount correction data ROM 107', respectively, to output them to the shift register 115. Thus, the second and third bytes of the data format shown in FIG. 10 store the X-axis direction displacement amount for fast operation read from the X-axis displacement amount correction data ROM 106' and the Y-axis direction displacement amount for fast operation read from the Y-axis displacement amount correction data ROM 107', respectively. After that, the shift register 115 serially outputs data for one word.

Other operation of the embodiment shown in FIG. 9 is similar to that of the embodiment shown in FIG. 3, and therefore, the explanation about it is omitted.

Although the image processor 2 applies the update pulse UDP to the mouse speed data formation circuit 116 to update a count value, or a speed data, of the mouse speed data formation circuit 116 in the embodiment shown in FIG. 9, the clock pulse CLK and the reset signal RST may be applied to the mouse speed data formation circuit 116 to update the speed data, as shown by broken line in FIG. 9. In this case, the count value of the mouse speed data formation circuit 116 may be updated in accordance with the reset signal RST when the clock pulse CLK is applied to the mouse speed data formation circuit 116 at a special timing which never arises in an ordinary mode. In such a varied embodiment, a signal line to input the update pulse UDP can be omitted, and consequently, a cost for the apparatus can be reduced.

As has been described, according to the present invention, a displacement amount of the cursor can be increased as the rotation rate of the mouse increases. Thus, a small quantity of displacement of the mouse permits the cursor to move a considerably long distance. Even if the speed of the ball in the X-axis direction and that in the Y-axis direction are different, a direction of the movement of the ball and a direction of the movement of the cursor can always coincide with each other because a displacement amount of the ball in the X-axis direction and that in the Y-axis direction are corrected based upon a correction parameter determined for either one of the X- and Y-axes. In this way, the cursor can be moved to any desired position without difficulty.

Although the present invention has been described with reference to specific embodiments, it should be understood that these embodiments are exemplary preferred embodiments and that modifications may be made without departing from the scope of the invention as defined in the appended claims.

What is claimed is:

1. A coordinate data generating apparatus which has a ball rotatable in any direction and which is for converting the quantity of the rotation of said ball into distance data about X-axis and Y-axis directions orthogonal to each other in a two-dimensional plane, comprising rotational quantity detecting means for detecting the quantities of the rotation of said ball in the X-axis and Y-axis directions for each predetermined period of time, comparing means for comparing the quantity of the rotation of said ball in the X-axis direction for the predetermined period of time with the quantity of the rotation of said ball in the Y-axis direction for that period of time, both of which are detected by said rotational quantity detecting means, and correcting means responding to comparison results from said comparing means for correcting displacements of said ball in the X-axis and Y-axis directions corresponding to the rotational quantities of said ball in the X-axis and Y-axis directions based upon only a first correction parameter determined in accordance with a variation in the rotational quantity of said ball in the X-axis direction when the rotational quantity of said ball in the X-axis direction for the predetermined period of time is larger than that in the Y-axis direction, or for correcting displacements of said ball in the X-axis and Y-axis directions corresponding to the rotational quantities of said ball in the X-axis and Y-axis directions based upon only a second correction parameter determined in accordance with a variation in the rotational quantity of said ball in the Y-axis direction when the rotational quantity of said ball in the Y-axis direction for the predetermined period of time is larger than that in the X-axis direction.

2. An apparatus according to claim 1, wherein said correcting means includes first X-axis distance data storing means for storing an X-axis direction distance data corrected based upon said first correction parameter, second X-axis distance data storing means for storing an X-axis direction distance data corrected based upon said second correction parameter, first Y-axis distance data storing means for storing a Y-axis direction distance data corrected based upon said first correction parameter, second Y-axis distance data storing means for storing a Y-axis direction distance data corrected based upon said second correction parameter, X-axis distance data reading means for reading the corrected X-axis direction distance data from said first X-axis distance data storing means when the quantity of the rotation of said ball in the X-axis direction for the specified period of time is larger than that in the Y-axis direction, or for reading the corrected X-axis direction distance data from said second X-axis distance data storing means when the quantity of the rotation of said ball in the Y-axis direction for the specified period of time is larger than that in the X-axis direction, and Y-axis distance data reading means for reading the corrected Y-axis direction distance data from said first Y-axis distance data storing means when the quantity of the rotation of said ball in the X-axis direction for the specified period of time is larger than that in the Y-axis direction, or for reading the corrected Y-axis direction distance data from said second Y-axis distance data storing means when the quantity of the rotation of said ball in the Y-axis direction for the specified period of time is larger than that in the X-axis direction.

3. An apparatus according to claim 2, wherein there are a plurality of pairs of said first and second X-axis distance data storing means and a plurality of pairs of said first and second Y-axis distance data storing means, said first correction parameter takes different values among the different pairs of said first X-axis distance data storing means and among the different pairs of said first Y-axis distance data storing means, said second correction parameter takes different values among the different pairs of said second X-axis distance data storing means and among the different pairs of said second Y-axis distance data storing means, and said apparatus further includes switch means for selectively switching the pairs used for correcting the distance data among said plurality of pairs of said first and second X-axis distance data storing means and among said plurality of pairs of said first and second Y-axis distance data storing means.

4. An apparatus according to claim 3, wherein said switch means responds to a switch command from the outside to practice its switching operation.

5. An apparatus according to claim 4, wherein the distance data read by said X-axis distance data reading means and said Y-axis distance data reading means are applied to an image processing device for processing data to represent an image on display means, and the switch command applied to said switch means is output from said image processor.

6. An apparatus according to claim 1, further comprising selecting means responding to a switch command from the outside for selecting either the X-axis and Y-axis direction distance data corrected by said correcting means or the X-axis and Y-axis direction distance data not corrected by said correcting means to output selected ones.

7. An apparatus according to claim 6, wherein the X-axis and Y-axis direction distance data output from said selecting means are applied to an image processing device for processing data to represent an image on display means, and the switch command applied to said selecting means is output from said image processing device.

8. An apparatus according to claim 1, wherein said correcting means includes distance data storing means for storing X-axis direction distance data corrected based upon said first or second correction parameter and Y-axis direction distance data corrected based upon said first or second correction parameter, and distance data reading means responding to comparison results by said comparing means for reading the X-axis and Y-axis direction distance data corrected based upon only said first parameter from said distance data storing means as data of distances corresponding to the quantities of the rotation of said ball in the X-axis and Y-axis directions when the quantity of the rotation of said ball in the X-axis direction for the specified period of time is larger than that in the Y-axis direction, or for reading the X-axis and Y-axis direction distance data corrected based upon only said second parameter from said distance data storing means as data of distances corresponding to the quantities of the rotation of said ball in the X-axis and Y-axis directions when the quantity of the rotation of said ball in the X-axis direction for the specified period of time is larger than that in the Y-axis direction.

9. A coordinate data generating apparatus which has a ball rotatable in any direction and which is for converting the quantity of the rotation of said ball into distance data about X-axis and Y-axis directions orthogonal to each other in a two-dimensional plane, comprising rotational quantity detecting means for detecting the quantities of the rotation of said ball in the X-axis and Y-axis directions for each predetermined period of time, comparing means for comparing the quantity of the rotation of said ball in the X-axis direction for the predetermined period of time with the quantity of the rotation of said ball in the Y-axis direction for that period of time, both of which are detected by said rotational quantity detecting means, distance data storing means for storing X-axis and Y-axis direction distance data corrected based upon a first correction parameter which is determined in accordance with a variation in the quantity of the rotation of said ball in the X-axis direction, and X-axis and Y-axis direction distance data corrected based upon a second correction parameter which is determined in accordance with a variation in the quantity of the rotation of said ball in the Y-axis direction, and distance data reading means responding to comparison results by said comparing means for reading the X-axis and Y-axis direction distance data corrected based upon only said first parameter from said distance data storing means as data of distances corresponding to the quantities of the rotation of said ball in the X-axis and Y-axis directions when the quantity of the rotation of said ball in the X-axis direction for the specified period of time is larger than that in the Y-axis direction, or for reading the X-axis and Y-axis direction distance data corrected based upon only said second parameter from said distance data storing means as data of distances corresponding to the quantities of the rotation of said ball in the X-axis and Y-axis directions when the quantity of the rotation of said ball in the X-axis direction for the specified period of time is larger than that in the Y-axis direction.

10. An apparatus according to claim 9, wherein there are a plurality of pairs of said distance data storing means, said first correction parameter takes different values among the different pairs of said distance data storing means, said second correction parameter takes different values among the different pairs of said distance data storing means, and said apparatus further includes switch means for selectively switching the pair used for correcting the distance data among said plurality of pairs of said distance data.

* * * * *